(12) United States Patent
Mattausch et al.

(10) Patent No.: US 7,881,525 B2
(45) Date of Patent: Feb. 1, 2011

(54) REFERENCE DATA OPTIMIZATION LEARNING METHOD AND PATTERN RECOGNITION SYSTEM

(75) Inventors: Hans Jurgen Mattausch, Higashihiroshima (JP); Tetsushi Koide, Higashihiroshima (JP); Yoshinori Shirakawa, Takatsuki (JP)

(73) Assignee: Hiroshima University, Higashihiroshima-shi (JP)

( * ) Notice: Subject to any disclaimer, the term of this patent is extended or adjusted under 35 U.S.C. 154(b) by 1133 days.

(21) Appl. No.: 11/508,901

(22) Filed: Aug. 24, 2006

(65) Prior Publication Data

US 2007/0003135 A1    Jan. 4, 2007

Related U.S. Application Data

(63) Continuation of application No. PCT/JP2005/003028, filed on Feb. 24, 2005.

(30) Foreign Application Priority Data

Feb. 27, 2004    (JP)    ............... 2004-053433

(51) Int. Cl.
 *G06K 9/00*    (2006.01)
(52) U.S. Cl. ...................... 382/159; 382/224
(58) Field of Classification Search ............... 382/155, 382/159, 224
See application file for complete search history.

(56) References Cited

U.S. PATENT DOCUMENTS

| | | | | |
|---|---|---|---|---|
| 5,329,596 A | * | 7/1994 | Sakou et al. ............... | 382/226 |
| 5,404,561 A | * | 4/1995 | Castelaz .................... | 712/17 |
| 5,657,397 A | * | 8/1997 | Bokser ...................... | 382/225 |
| 5,703,959 A | * | 12/1997 | Asano et al. ............... | 382/133 |
| 5,832,182 A | * | 11/1998 | Zhang et al. .............. | 706/50 |
| 6,345,119 B1 | * | 2/2002 | Hotta et al. ............... | 382/225 |
| 6,356,650 B1 | | 3/2002 | Wirtz | |
| 6,985,610 B2 | * | 1/2006 | Suchard et al. ........... | 382/119 |
| 7,558,426 B2 | * | 7/2009 | Katoh et al. .............. | 382/225 |

FOREIGN PATENT DOCUMENTS

| | | |
|---|---|---|
| EP | 0 694 852 A1 | 1/1996 |
| EP | 1 022 682 A2 | 7/2000 |

(Continued)

OTHER PUBLICATIONS

Hans Jürgen Mattausch, et al. "Fully-Parallel Pattern-Matching Engine With Dynamic Adaptability to Hamming or Manhattan Distance" 2002 Symposium on VLSI Circuits Digest of Technical Papers, 2002, pp. 252-255.

(Continued)

*Primary Examiner*—Brian P Werner
(74) *Attorney, Agent, or Firm*—Oblon, Spivak, McClelland, Maier & Neustadt, L.L.P.

(57) ABSTRACT

The present invention is directed to a pattern recognition system in which new reference data to be added is efficiently learned. In the pattern recognition system, there is performed the calculation of distances equivalent to similarities between input data of a pattern search target and a plurality of reference data, and based on input data of a fixed number of times corresponding to the reference data set as a recognized winner, a gravity center thereof is calculated to optimize the reference data. Furthermore, a threshold value is changed to enlarge/reduce recognition areas, whereby erroneous recognition is prevented and a recognition rate is improved.

19 Claims, 11 Drawing Sheets

FOREIGN PATENT DOCUMENTS

| | | |
|---|---|---|
| JP | 57-212586 A | 12/1982 |
| JP | 61-261799 A | 11/1986 |
| JP | 07-192093 A | 7/1995 |
| JP | 09-69159 A | 3/1997 |
| KR | 1998-023917 | 7/1998 |
| KR | 1999-027482 | 4/1999 |
| KR | 2003-0074141 | 9/2003 |
| KR | 2003-0095300 | 12/2003 |

OTHER PUBLICATIONS

Tetsushi Koide, et al. "An Associative Memory for Real-Time Applications Requiring Fully Parallel Nearest Manhattan-Distance-Search" Proc. of the Workshop on Synthesis and System Integration of Mixed Technologies, 2003, pp. 1-6.

Hans Jürgen Mattausch, et al. "Compact Associative-Memory Architecture With Fully Parallel Search Capability for the Minimum Hamming Distance" IEEE Journal of Solid-State Circuits, vol. 37, No. 2, Feb. 2002, pp. 218-227.

Yuji Yano, et al. "Fully Parallel Nearest Manhattan-Distance-Search Memory With Large Reference-Pattern Number" Extend. Abst. of the International Conf. on Solid-State Devices and Materials, 2002, Two (2) Pages.

Yoshihito Amamiya, "Neural Network LSI" Institute of Electronics, Information and Communication Engineers, 1995, pp. 34-79.

S. R. Amendolia, et al., "The AMchip: a full-custom CMOS VLSI associative memory for pattern recognition", Proc. Nuclear Science Symposium and Medical Imaging Conference, 1991, pp. 716-718.

* cited by examiner

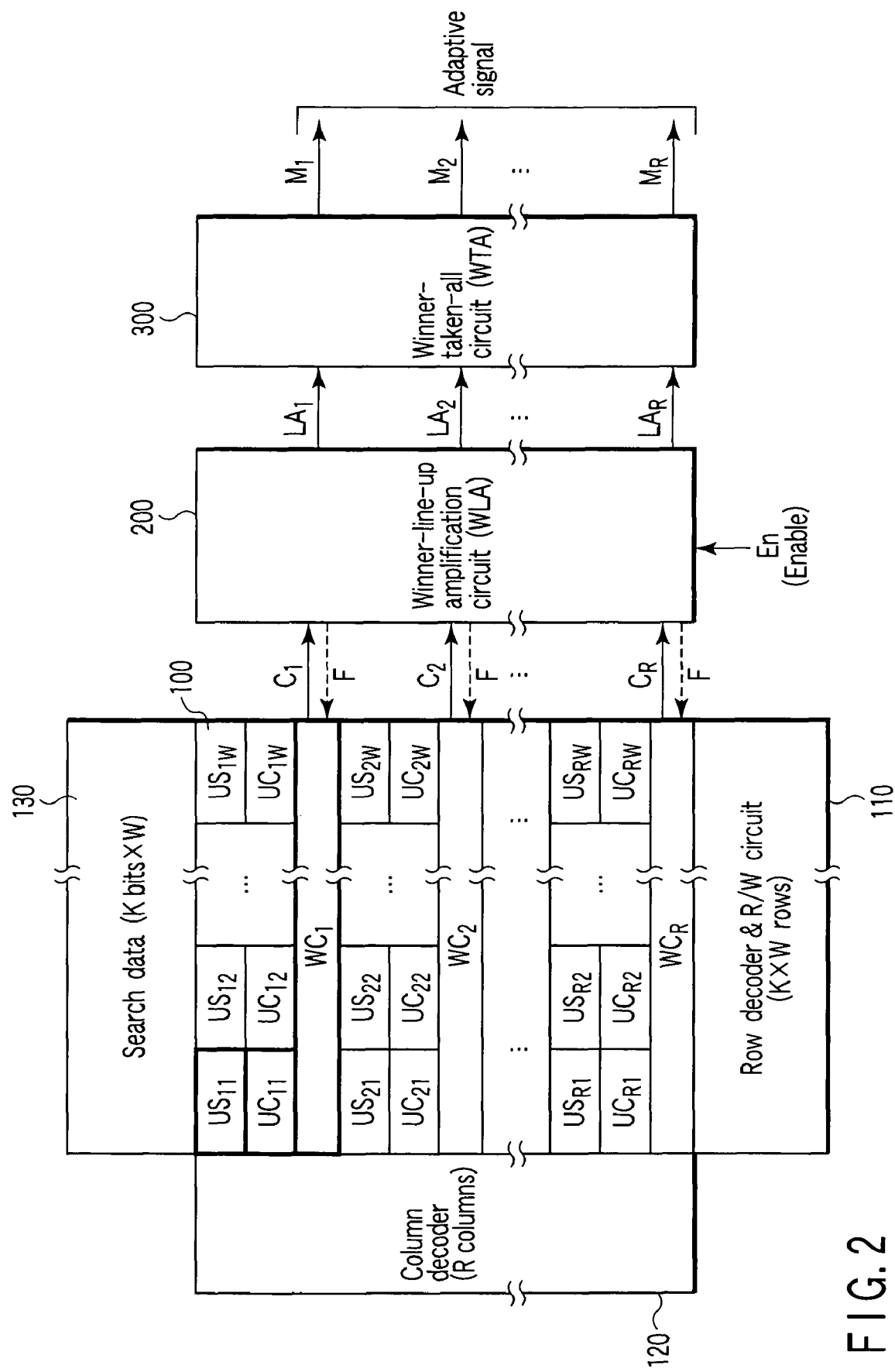
F I G. 2

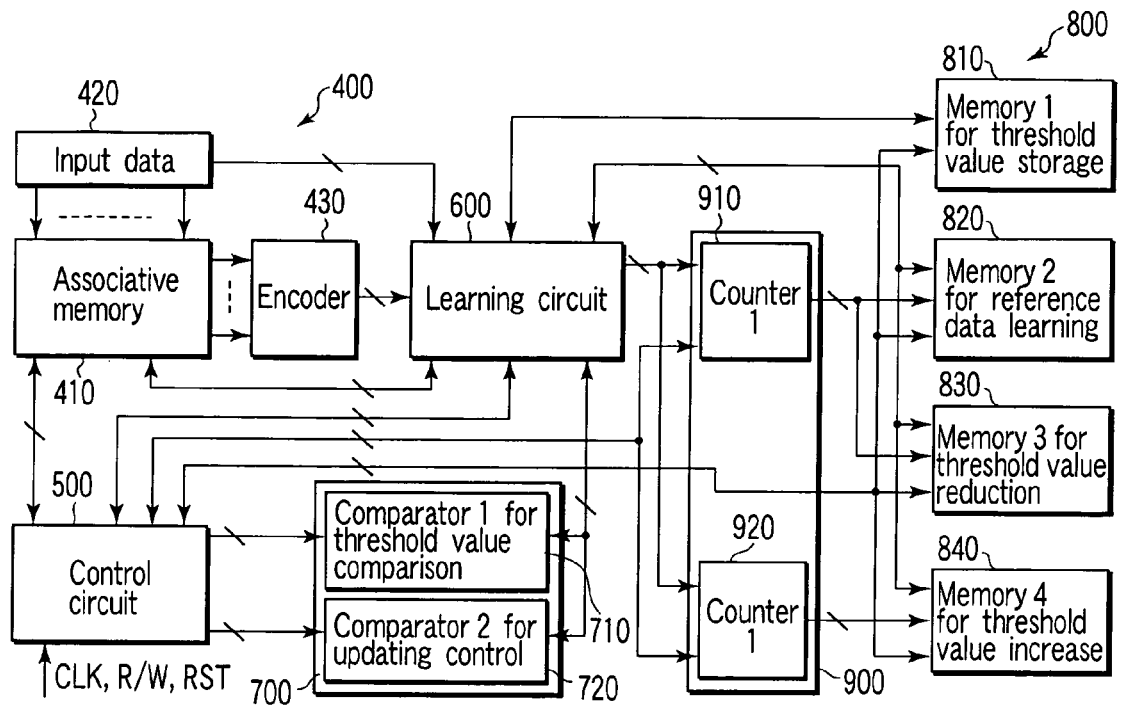
F I G. 10
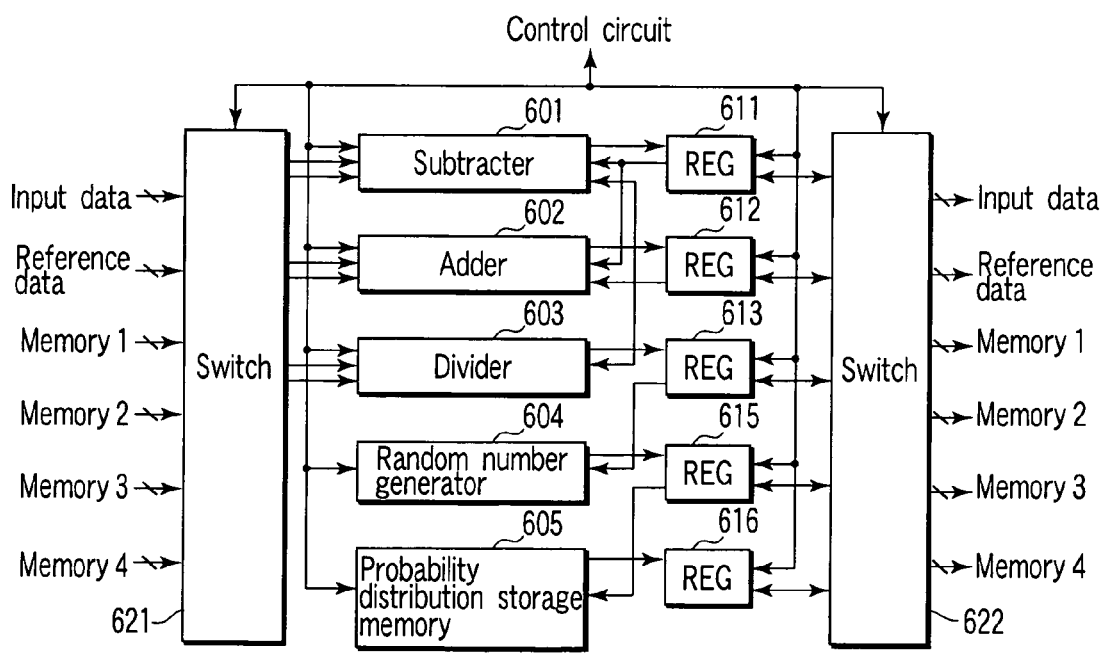
F I G. 11

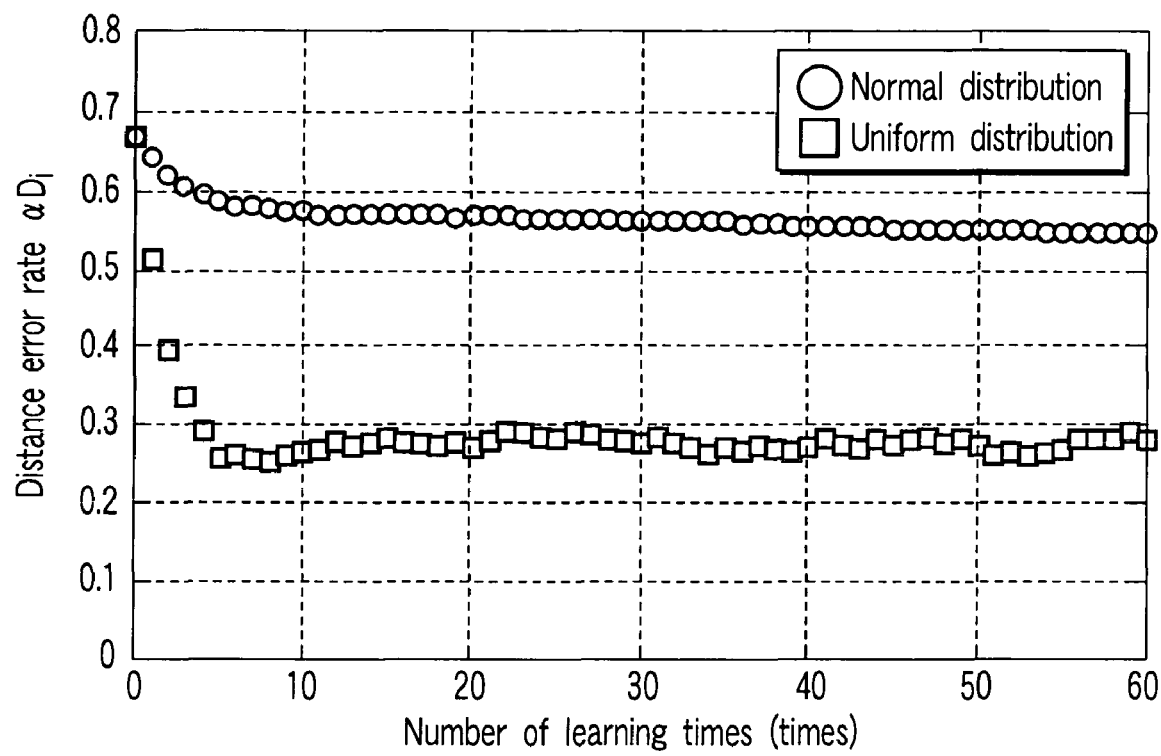
F I G. 14

REFERENCE DATA OPTIMIZATION LEARNING METHOD AND PATTERN RECOGNITION SYSTEM

CROSS-REFERENCE TO RELATED APPLICATIONS

This is a Continuation Application of PCT Application No. PCT/JP2005/003028, filed Feb. 24, 2005, which was published under PCT Article 21(2) in Japanese.

This application is based upon and claims the benefit of priority from prior Japanese Patent Application No. 2004-053433, filed Feb. 27, 2004, the entire contents of which are incorporated herein by reference.

BACKGROUND OF THE INVENTION

1. Field of the Invention

The present invention relates to a reference data optimization learning method for adding reference data for a pattern matching process to be recognized, and a pattern recognition system for recognizing/learning the reference data by using this method.

2. Description of the Related Art

In the pattern recognition system, the pattern matching process is an important factor for a recognition process. According to a conventional system, a mode realized based on a processor is most common. This model employs a method for sequentially comparing data of input patterns with a plurality of reference data in a memory to detect reference data indicating the most similar patterns. However, the method of this model has a problem in that the sequential comparison necessitates much processing time, and the time for the processing is increased in proportion to an increase in the number of comparison data. Regarding the reference data, due to the sequential comparison, there is no learning concept in changing of a comparison order or registration of new reference data, making it impossible to obtain a processing time reduction effect by learning.

Pattern recognition and learning are functions essential for building an artificial intelligence system which has capabilities similar to those of the human brain. Accordingly, it is technically very significant to realize such functions in an integrated circuit. Most of methods proposed thus far to realize pattern recognition and learning functions use a neural network. An example is described in Document 1 below.

[Document 1] Yoshihito Amamiya, "Neural Network LSI", Institute of Electronics, Information and Communication Engineers, 1995.

However, the method using the neural network has had a problem in that a threshold value of each neuron and a load of each network must be updated necessitating a great deal of processing time. As there is no method available to efficiently store patterns in the network, information of the patterns must be embraced in a network structure itself. Besides, to learn to recognize a new pattern after completion of network learning, relearning of the entire network is necessary, and it is difficult to update the load of the network by learning while carrying out a recognition process.

Recent progress in the realization method by hardware using a neural network has not been as fast as originally expected, and it is now difficult to realize an LSI in terms of degree of integration and power consumption. Under these circumstances, there is a demand for a better realization method by new hardware which can efficiently store patterns by incorporating a memory element.

With the foregoing in mind, development of a small-area/high-speed associative memory based on a fully parallel architecture has recently been pursued. Examples are described in detail in Documents 2 to 8 below.

[Document 2] H. J. Mattausch, N, Omori, S. Fukae, T. Koide, and T. Gyoten, "Fully-parallel pattern-matching engine with dynamic adaptability to Hamming or Manhattan distance", 2002 Symposium on VLSI Circuit Dig. of Tech. Papers, pp. 252-255, 2002.

[Document 3] T. Koide, Y. Yano, H. J. Mattausch, "An associative memory for real-time applications requiring fully parallel nearest Manhattan-distance-search", Proc. of the Workshop on Synthesis And System Integration of Mixed Technologies, pp. 200-205, 2003.

[Document 4] H. J. Mattaush. T. Gyohten, Y. Soda, T. Koide, "Compact associative-memory architecture with fully-parallel search capability for the minimum Hamming distance", IEEE Journal of Solid-State Circuits, Vol. 37, pp. 218-227, 2002.

[Document 5] Y. Yano, T. Koide, H. J. Mattausch, "Fully parallel nearest Manhattan-distance search memory with large reference-pattern number", Extend. Abst. of the International Conf. on Solid-State Devices and Materials, pp. 254-255, 2002.

[Document 6] Jpn. Pat. Appln. KOKAI Publication. No. 2001-011760

[Document 7] Jpn. Pat. Appln. KOKAI Publication. No. 2002-159436

[Document 8] Jpn. Pat. Appln. KOKAI Publication No. 2002-165759

The associative memory has a smallest distance search function which is an important element for realizing a recognition function, and can make parallel comparison among all data by comparing search data with each reference data based on digital comparison calculation and analog smallest value calculation. Accordingly, the associative memory is attracting attention as it can realize a high-speed pattern matching process.

However, even in the case of the pattern recognition system based on the associative memory, a specific method is yet to be established which enables efficient learning to recognize new reference data, and a process of adding or replacing reference data needs a great deal of time.

BRIEF SUMMARY OF THE INVENTION

As described above, in the artificial intelligence system, the function of executing pattern recognition corresponding to a change in an input environment is necessary, and execution of wide-ranging recognition by learning is important. According to the conventional system, learning is carried out by the method based on the processor or the neural network. To realize the learning, the reference data must be updated by one method or another in the case of the system based on the processor, and each network load of the entire network must be updated in the case of the system based on the neural network. Thus, in the case of carrying out pattern recognition and learning together, the above conventional system has a problem in that integration is difficult in terms of power consumption and circuit size. The pattern recognition system based on the associative memory adapted to realize a high-speed matching process has been proposed. However, a specific method for executing efficient learning to recognize new reference data to be added is yet to be established, necessitating a great deal of time for the reference data recognizing/learning process.

It is an object of the present invention to provide a reference data optimization learning method which enables automatic learning of recognition of new reference data essential to a pattern matching process within a relatively short time, and a pattern recognition system which enables shortening of time necessary for pattern recognition by employing this method.

The reference data optimization learning method of the present invention has the following features:

(1) A reference data optimization learning method is provided, which performs calculation of distances equivalent to similarities between input data of a pattern search target and a plurality of reference data and which is used for pattern recognition for selecting, as recognition data, reference data of a smallest distance present in a recognition area decided by a threshold value and which optimizes the reference data for the pattern recognition by learning the recognition data. The method is characterized by comprising: fetching, as many as a fixed number of times, input data corresponding to the reference data to be selected as the recognition data; obtaining a gravity center point of a distance distribution between the input data and the reference data; and optimizing a position of the reference data to be positioned in the gravity center point.

(2) In the method described in the paragraph (1), a movement is limited in optimizing the position of the reference data, in order to prevent overlap between recognition areas of the reference data and adjacent reference data.

(3) In the method described in the paragraph (1), the recognition areas are enlarged or reduced by changing a threshold value, in optimizing the position of the reference data, in order to prevent overlap between the recognition areas set in reference data adjacent to each other.

(4) The reference data optimization learning method may perform calculation of distances equivalent to similarities between input data of a pattern search target and a plurality of reference data and may be used for pattern recognition for selecting, as recognition data, reference data of a smallest distance present in a recognition area decided by a threshold value and which optimizes the reference data for the pattern recognition by learning the recognition data. The method may comprise: counting the numbers of input data present inside and outside the recording area; determining the side of the numbers of input data inside and outside the recording area which first reaches a fixed number of times; and optimizing a position of the reference data by changing the threshold value to the side which reaches the fixed number of times to enlarge or reduce the recognition area.

(5) In the method described in the paragraph (3) or (4), a changing amount of the threshold value is selected from a preset probability distribution in optimizing the position of the reference data.

(6) In the method described in the paragraph (3) or (4), the threshold value is changed only when a value indicating a distance between a center of a group of the input data and current reference data exceeds a reference value.

(7) In the method described in the paragraph (1), one of the Euclidean distance, Manhattan distance, Hamming distance, and Mahalanobis distance is used as an index of a distance supplied for the distance calculation.

The pattern recognition system according to this invention has the following features:

(8) The system comprises: an associative memory equipped with at least reference data storage means for storing a plurality of reference data to recognize search data of input patterns, smallest distance search means for obtaining the search data and reference data present in a smallest distance; and determination means for determining identity between the search data and the reference data of the smallest distance in accordance with whether the smallest distance is equal to or more than a threshold value; and optimization means for fetching, as many as a fixed number of times, input data corresponding to the reference data to be selected as recognition data, obtaining a gravity center point of a distance distribution between the input data and the reference data, and optimizing a position of the reference data to be positioned in the gravity center point. The system is characterized in that the reference data stored in the reference data storage means are updated based on the optimized reference data.

(9) In the system described in the paragraph (8), the optimization means limits a movement to prevent overlap between a recognition area decided by a threshold value of the reference data and a recognition area of adjacent reference data.

(10) In the system described in the paragraph (8), the optimization means enlarges or reduces recognition areas by changing the threshold value to prevent overlap between the recognition areas of reference data adjacent to each other decided by threshold values.

(11) The system may comprise: an associative memory equipped with at least reference data storage means for storing a plurality of reference data to recognize search data of input patterns, smallest distance search means for obtaining the search data and reference data present in a smallest distance, and determination means for determining identity between the search data and the reference data of the smallest distance in accordance with whether the smallest distance is equal to or more than a threshold value; and optimization means for counting the numbers of input data present inside and outside a recognition area decided by the threshold value, and changing the threshold value to a side which first reaches a fixed number of times to enlarge/reduce the recognition area. The system may be characterized in that the reference data stored in the reference data storage means are updated based on the optimized reference data.

(12) In the system described in the paragraph (10) or (11), the optimization means selects a changing amount of the threshold value from a preset probability distribution.

(13) In the system described in the paragraph (10) or (11), the optimization means compares a value indicating a distance between a center of a group of the input data and current reference data with a reference value, and changes the threshold value only when the reference value is exceeded.

(14) In the system described in the paragraph (8) or (11), one of the Euclidean distance, Manhattan distance, Hamming distance, and Mahalanobis distance is used as an index of a distance supplied for the distance calculation.

(15) In the system described in the paragraph (8) or (11), the associative memory and the optimization means are incorporated in a one-chip integrated circuit.

(16) A pattern recognition system may comprises: an arithmetic processing device equipped with a processor for executing arithmetic processing in accordance with a program, and storage means for storing at least a plurality of reference data to recognize search data of input patterns, an arithmetic processing result of the processor, and a parameter used for the arithmetic processing, the processor obtaining the search data and reference data present in a smallest distance based on the program, and determining identity between the search data and the reference data of the smallest distance in accordance with whether the smallest distance is equal to or more than a threshold value; and optimization means for fetching, as many as a fixed number of times, input data corresponding to the reference data to be selected as recognition data, obtaining a gravity center point of a distance distribution between the input data and the reference data, and optimizing a position of the reference data to be positioned in the gravity center point. The system may be characterized in that the reference data stored in the reference data storage means are updated based on the optimized reference data.

(17) In the system described in the paragraph (16), the optimization means limits a movement to prevent overlap between a recognition area decided by a threshold value of the reference data and a recognition area of adjacent reference data.

(18) In the system described in the paragraph (16), the optimization means enlarge/reduces recognition areas by changing the threshold value to prevent overlap between the recognition areas of reference data adjacent to each over decided by threshold values.

(19) The system may comprise: an arithmetic processing device equipped with a processor for executing arithmetic processing in accordance with a program, and storage means for storing at least a plurality of reference data to recognize search data of input patterns, an arithmetic processing result of the processor, and a parameter used for the arithmetic processing, the processor obtaining the search data and reference data present in a smallest distance based on the program, and determining identity between the search data and the reference data of the smallest distance in accordance with whether the smallest distance is equal to or more than a threshold value; and optimization means for counting the numbers of input data present inside and outside a recognition area decided by the threshold value, and changes the threshold value to a side which first reaches a fixed number of times to enlarge/reduce the recognition area. They system may be characterized in that the reference data stored in the reference data storage means are updated based on the optimized reference data.

(20) In the system described in the paragraph (18) or (19), the optimization means selects a changing amount of the threshold value from a preset probability distribution.

(21) In the system described in the paragraph (18) or (19), the optimization means compares a value indicating a distance between a center of a group of the input data and current reference data with a reference value, and changes the threshold value only when the reference value is exceeded.

(22) In the system described in the paragraph (16) or (19), one of the Euclidean distance, Manhattan distance, Hamming distance, and Mahalanobis distance is used as an index of a distance supplied for the distance calculation.

(23) In the system described in the paragraph (16) or (19), the arithmetic processing device and the optimization means are incorporated in a one-chip integrated circuit.

BRIEF DESCRIPTION OF THE SEVERAL VIEWS OF THE DRAWING

FIG. 2 is a block diagrams showing a configuration example of an exemplary fully parallel associative memory of the associative memory of FIG. 1.

FIG. 10 is a block diagram showing architecture of the associative memory to which a learning function is added according to the present invention.

FIG. 11 is a block diagram showing a specific configuration of a learning circuit shown in FIG. 10.

FIG. 14 is a graph showing a simulation result of threshold optimization learning (recognition area optimization) according to the present invention.

DETAILED DESCRIPTION OF THE INVENTION

Best modes for carrying out the present invention will be described below in detail with reference to the drawings.

Figure 1:
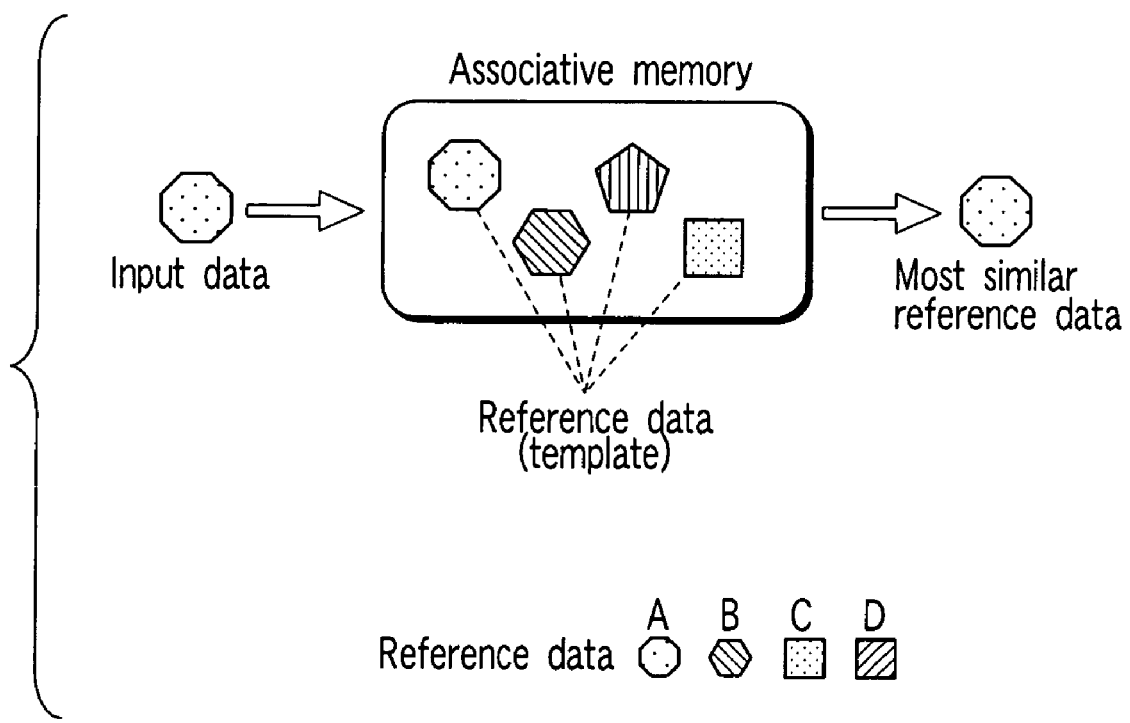
FIG. 1 is a conceptual diagram of an associative memory to which a method of the present invention is applied.

As shown in FIG. 1, an associative memory to which a method of the present invention is applied is a functional memory which compares a plurality of reference data (or template) prestored in the memory with input data (or search data) by similarities based on predesignated distance indexes, and detects reference data (winner hereinafter) most similar (smallest distance) to the input data to perform pattern matching.

FIG. 2 is a block diagram showing a configuration example of a type (fully parallel associative memory) for executing fully parallel smallest distance search whose development has been pursued to realize high-speed processing, a small area, and low power consumption as an example of the associative memory. In the drawing, a memory core portion includes a memory area 100, a winner-line-up amplification circuit (WLA circuit hereinafter), and a winner-taken-all circuit (WTA circuit hereinafter) 300, and has a row decoder and R/W circuit (M×W columns) 110, a row decoder (R rows) 120, and a search data storage circuit (M bits×W) 130 as peripheral circuits.

The memory area 100 includes W×R pieces of unit storage circuits (US) constituted of SRAM cells for storing reference data by units (M bits), W×R pieces of unit comparison circuits (UC) for calculating an absolute value (the Manhattan distance described below) of a difference between reference data and search data for each unit, and R pieces of word weight comparison circuits (WC) for converting the calculated distance into an analog voltage (or current).

A comparison signal $C_i$ generated by the word weight comparison circuit WC enters the WLA circuit 200. The WLA circuit 200 controls this signal $C_i$ based on its own balance, and amplifies a difference of voltages between rows to be largest at an initial stage. The WLA circuit 200 and the WTA circuit 300 are characterized in that area increase rates can be realized by small linear O(R) areas with respect to the number of rows R.

The WTA circuit 300 has a function of further amplifying the difference of voltage outputs $LA_i$ between the rows amplified by the WLA circuit 200. In an output $M_i$ of the WTA circuit 300, a digital signal is generated in which a winner row is "1" and other loser rows are "0". The WLA circuit 200 uses an internal feedback signal F so that a winner row of an amplification point can obtain largest amplification. When it is returned to the word weight comparison circuit WC, a voltage follower circuit incorporated in the WLA circuit 200 is used to achieve a high feedback speed.

The Manhattan distance D is represented by the following equation when there are vectors $a=(a_1, a_2, \ldots, a_i, \ldots, a_N)$, and $b=(b_1, b_2, \ldots, b_i, \ldots, b_N)$.

$$D = \sum_{i=1}^{N} |a_i - b_i| \qquad \text{[Equation 1]}$$

Figure 3:
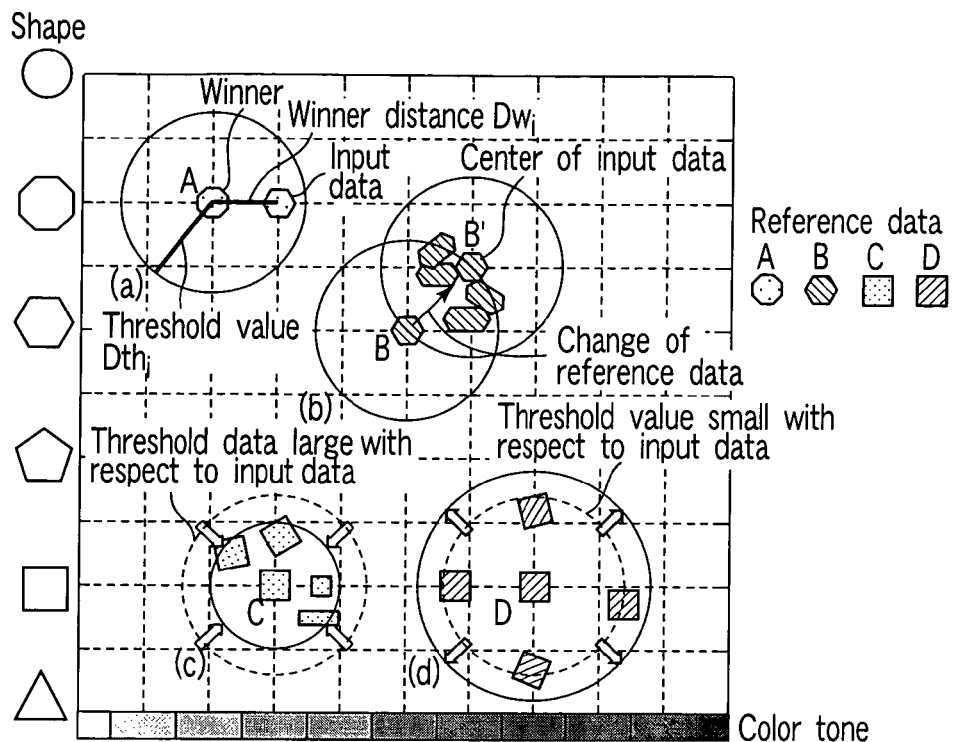
FIG. 3 is a conceptual diagram of an optimization learning method according to the present invention.

FIG. 3 is a conceptual diagram of an optimization learning algorithm according to the present invention. A case of classifying patterns two-dimensionally by color tones and shapes will be taken as an example. In the upper left (a) of FIG. 3, among input data (octagonal mark) and four prestored reference data A, B, C and D, a most similar pattern having smallest Manhattan distance 1 is selected as a winner. The winner in this case is an octagonal mark of A. The smallest Manhattan distance is set as "winner distance $Dw_i$".

If the winner distance $Dw_i$ is equal to or less than a threshold distance $Dth_i$ for deciding a predesignated recognition area with respect to reference data i ($Dw_i \leq Dth_i$), the winner is regarded as a recognized winner. This inner distance $Dw_i$ is called "recognized winner distance $Drw_i$". Accordingly, when the most similar pattern is present in the predesignated threshold value, the pattern is recognized by the associative memory. On the other hand, if $Dw_i$ is larger than $Dth_i$ ($Dw_i > Dth_i$), its input data is considered nonsimilar to relevant reference data, considered nonsimilar to any reference data, and not recognized. However, the associative memory compares the reference data with the input data to search a winner thereby obtaining a winner distance $Dw_i$. Thus, it is important to prepare most optimal reference data for effective recognition. For example, in the center (b) of FIG. 3, when input data distribution is as shown, a center of an input data group indicated by reference data B is preferably optimal reference data B'.

As recognition of "recognized winner distance $Drw_i$" is determined by comparing the winner distance $Dw_i$ with the threshold value $Dth_i$, setting of an optimal threshold value $Dth_i$ is important for improving recognition. For example, regarding the threshold value $Dth_i$, assuming that a threshold value enabling recognition (100%) of all (similar) input data corresponding to certain reference data is $Dmax_i$, the recognition rate drops when $Dth_i$ is too small as compared with $Dmax_i$, or erroneous recognition occurs conversely when it is too large and matched with the other reference data ([c] and [d] in FIG. 3). Thus, as there is a possibility of erroneous recognition depending on an overlap degree when an area (recognition area) of the threshold value $Dth_i$ overlaps the reference data, the overlap of the recognition area must be eliminated.

Figure 4:
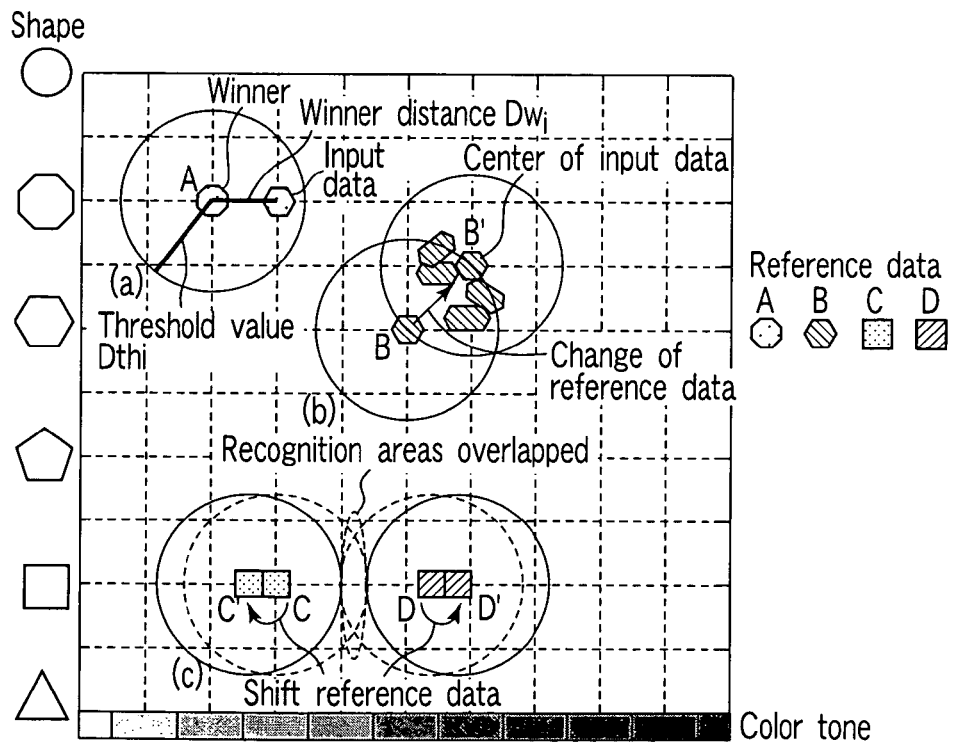
FIG. 4 is a conceptual diagram of the optimization learning method of the present invention.
Figure 5:
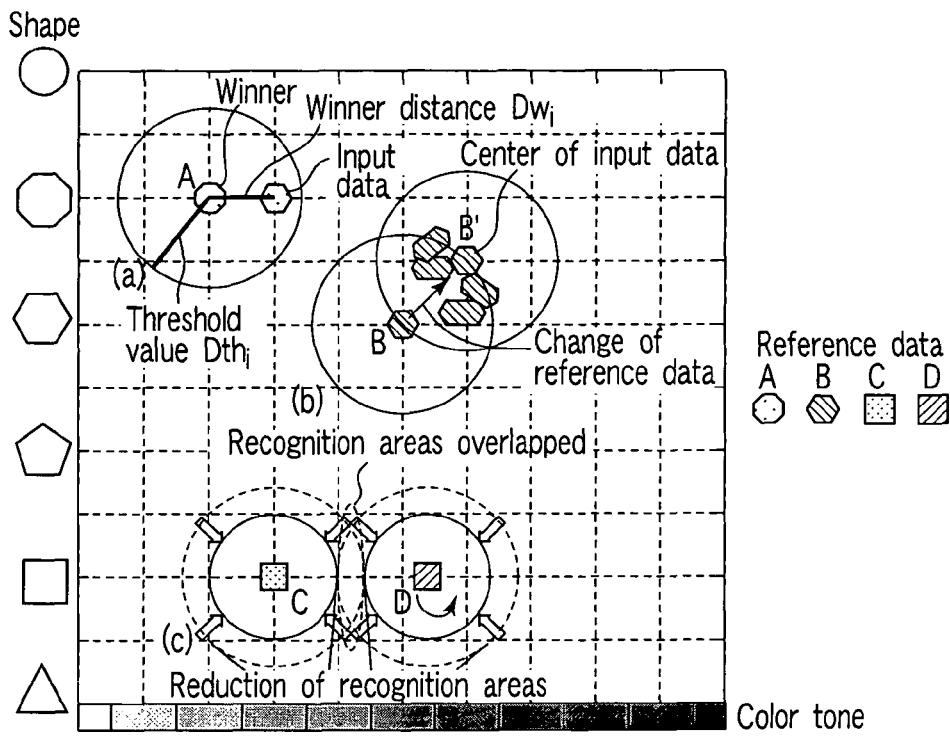
FIG. 5 is a conceptual diagram of the optimization learning method of the present invention.

The elimination of the overlap can be realized by shifting the reference data (C→C', D→D') as shown in the lower part (c) of FIG. 4, or reducing the threshold values $Dth_i$ of the reference data i as shown in the lower part (c) of FIG. 5. Apparently, in the system based on the associative memory, it is necessary to optimize the recognition area based on optimization of the threshold value $Dth_i$ with respect to each reference data i to execute correct recognition.

Thus, the optimal learning of the present invention means two, i.e., "reference data optimal learning" for updating the reference data to be optimal and "recognition area optimal learning" for updating the threshold value of each reference data to be optimal. Learning algorithms will be described below in detail by referring to FIGS. 6 to 9.

Figure 6:
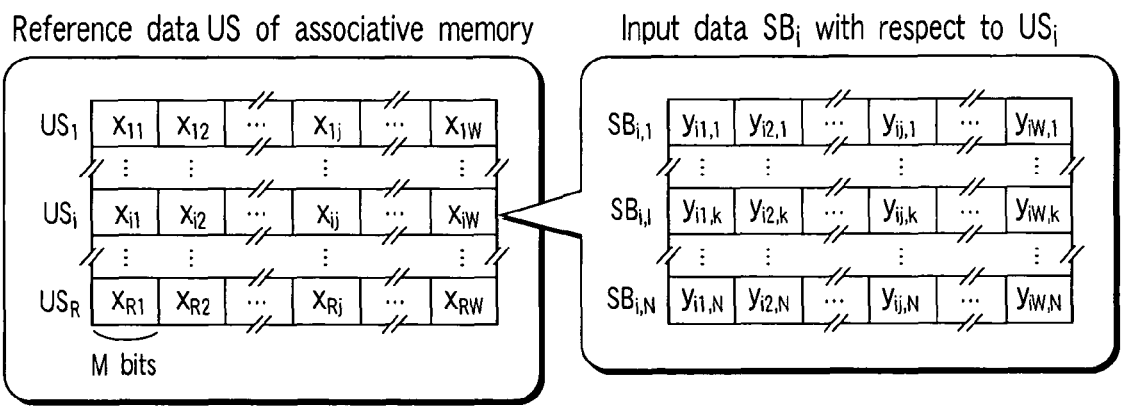
FIG. 6 is a diagram showing a correlation between reference data and input data of the associative memory to which the present invention is applied.

In the description below, US, SB and G respectively mean reference data, input data, and a vector of a difference between the reference data and the input data. As shown in FIG. 6, a set of reference data stored in the associative memory is $US=\{US_1, US_2, \ldots, US_i, \ldots, US_R\}$ (R is the number of data (number of rows) of the associative memory). Each reference data is constituted of M-bit W word. Accordingly, it can be represented by $US_i=(x_{i1}, x_{i2}, \ldots, x_{ij}, \ldots x_{iW})$ (W is the number of vectors (number of columns) of the associative memory). With respect to the reference data $US_i$ ($1 \leq i \leq R$), a set of N pieces of input data recognized as recognized winners is defined to be $SB_i=\{SB_{i,1}, SB_{i,2}, \ldots, SB_{i,k}, \ldots, SB_{i,N}\}$ ($1 \leq k \leq N$), and input data is defined to be $SB_{i,k}=(y_{i1,k}, y_{i2,k}, \ldots, y_{ij,k}, \ldots, y_{iW,k})$ ($1 \leq j \leq W$).

Figure 7:
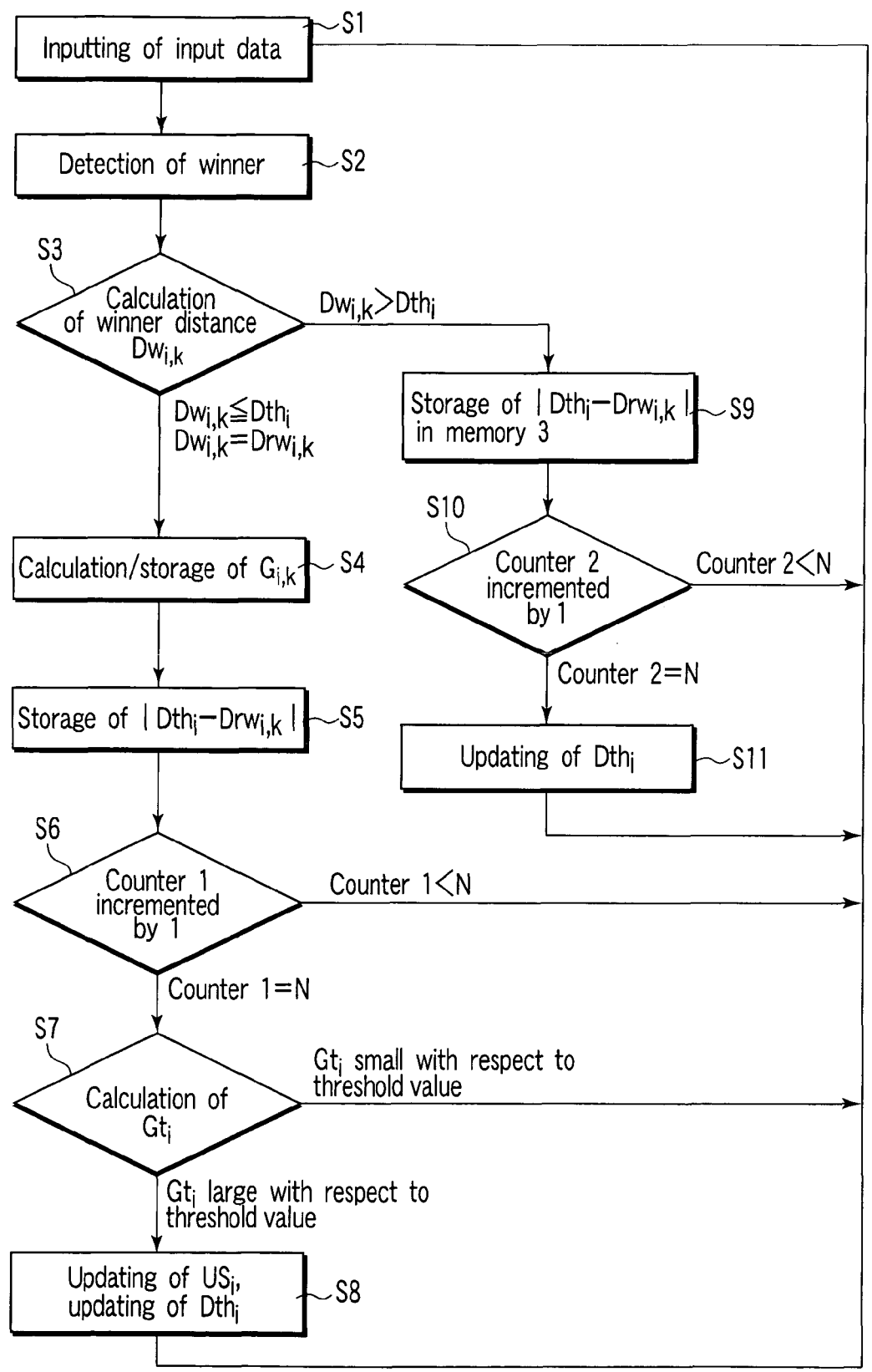
FIG. 7 is a flowchart showing optimization learning algorithms of reference data and a recognition area according to the present invention.

FIG. 7 is a flowchart showing the optimization learning algorithms of the reference data and the recognition area according to the present invention.

First, the optimization learning algorithm of the reference data will be described. According to this algorithm, it is presumed that optimal reference data is a gravity center (center) of all input data to set certain reference data to be a recognized winner ([a] in FIG. 3). However, as pieces of all input data are not known first at once in on-line recognition in which the input data are continuously input with time, it is generally difficult to obtain optimal reference data. Thus, according to the present invention, based on input data of a fixed number of times corresponding to the reference data set as the recognized winner, a gravity center thereof is calculated to optimize the reference data. Through such a process, even when the input data distribution changes for one reason or another, it is possible to satisfactorily deal with the change of the distribution.

The learning algorithm for updating the reference data to be optimal will be described by referring to the flowchart of FIG. 7. First, when input data $SB_{i,k}$ is input to the US (step S1) to execute winner detection (step S2), the $US_i$ becomes a winner. Then, a winner distance $Dw_{i,k}$ is calculated to be compared with a threshold value $Dth_i$ (step S3). When a result of the comparison is $Dw_{i,k} \leq Dth_i$, $Drw_i=Dw_{i,k}$ is recognized, and a vector difference $G_{i,k}$ between the input data $SB_{i,k}$ and the reference data $US_i$ is calculated to be stored by following equation (1) (step S4).

[Equation 2]

$$G_{i,k} = SB_{i,k} - US_i \qquad (1)$$

Based on input data corresponding to reference data which has become a recognized winner N times (steps S6, S7), the reference data $US_i$ is updated by following equation (2) (step S8).

[Equation 3]

$$US_i = US_i + \frac{1}{N}\sum_{k=1}^{N} G_{i,k} \qquad (2)$$

Recognition is carried out for each inputting of input data, and $G_{i,k}$ is calculated N times for the reference data which has become a recognized winner N times (steps S6, S7). $G_{i,k}$ is a vector indicating a degree of a difference between the input data and the reference data which has become a recognized winner. A second term of equation (2) is calculated from $G_{i,k}$ of N times, and a degree of a difference gravity center between the reference data and the input data is determined. If the difference is large, the reference data is updated to be optimal from equation (2) to reduce the difference (step S8). A criterion of the difference degree is the ratio of a distance (e.g., the Manhattan distance) obtained from the difference between the input data of N times and the reference data with a threshold value (e.g., the Manhattan distance). The criterion of the difference indicated by the second term of equation (2) is similar to that of equation (7) used for an updating process described below. The procedures of the reference data updating and the threshold updating are similar, and the reference data and the threshold value are updated when a difference is large between the gravity center of the input data and the reference data.

Next, the learning algorithm for optimizing the threshold value $Dth_i$ of each reference data $US_i$ will be described.

Figure 8:
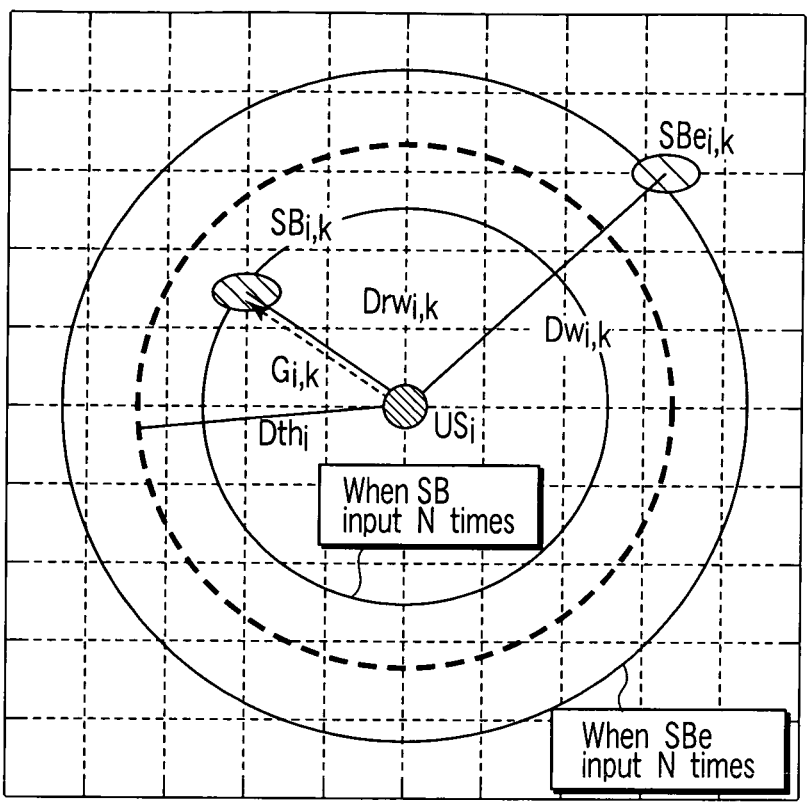
FIG. 8 is a conceptual diagram showing a situation of reducing/enlarging the recognition area to explain the threshold optimization learning algorithm of FIG. 7.

To begin with, changing of the threshold value means reduction or enlargement of the recognition area. For this purpose, it is necessary to determine a rate of inputting input data to the inside/outside of the recognition area. According to the present invention, the number of input data present inside ($\leq Dth_i$) or outside ($>Dth_i$) of the recognition area indicated by a dotted line in FIG. 8 is counted (steps S6, S10), and the recognition area is reduced/enlarged when predesignated input data of fixed number of times is generated N times.

When certain reference data $US_i$ becomes a winner (step S2), i.e., if a winner distance is smaller than the threshold value, the winner distance is set as a recognized winner distance $Drw_{i,k}$ (1, 2, ..., k, ..., N) (step S3), and a set of these input data is set as $SB_i = \{SB_{i,1}, SB_{i,2}, ..., SB_{i,k}, ..., SB_{i,N}\}$. On the other hand, if the winner distance is larger than the threshold value, the winner distance is set as a recognized winner distance $Dw_{i,k}$ (1, 2, ..., k, ..., N), and a set of these input data is set as $SBe_i = \{SBe_{i,1}, SBe_{i,2}, ..., SBe_{i,k}, ..., SBe_{i,N}\}$. These are parameters for obtaining an updating amount Dc of the threshold value. A difference $Dg_i$ between $Dth_i$ and $Dw_i$ or $Drw_i$ is obtained by following equations (3), (4) (step S11). $Dg_i$ indicates a degree of deviation of the input data of N times from the threshold value, and the threshold updating means reduction of this deviation.

[Equation 4]

$$\begin{cases} Dg_i = \dfrac{1}{N}\sum_{k=1}^{N} |Dth_i - Drw_{i,k}| \begin{pmatrix} \text{in the case of recognition of } N \text{ times} \\ \text{first inside the recognition area} \end{pmatrix} & (3) \\ \\ Dg_i = \dfrac{1}{N}\sum_{k=1}^{N} |Dth_i - Dw_{i,k}| \begin{pmatrix} \text{in the case of recognition of } N \text{ times} \\ \text{first outside the recognition area} \end{pmatrix} & (4) \end{cases}$$

Figure 9:
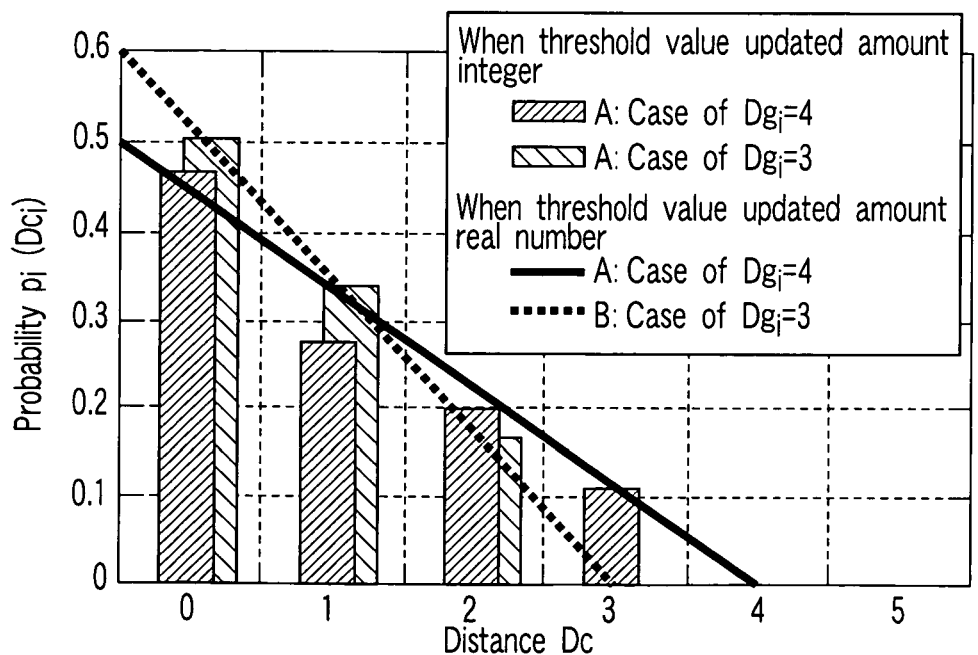
FIG. 9 is a characteristic diagram showing a distribution of probabilities of selecting an updated amount of a threshold value according to the present invention.

As shown in FIG. 9, an updating amount $Dc_i$ of the threshold value is selected from preset probability distribution, e.g., probability distribution of triangular distribution. FIG. 9 shows probability distribution $\rho(Dc_i)$ of selecting the updating amount $Dc_i$ of the threshold value, A indicating a case of $Dg_i = 4$ and B indicating a case of $Dg_i = 3$.

[Equation 5]

$$p(Dc_i) = \frac{2}{(Dg_i + 1)^2} Dc_i + \frac{2}{Dg_i + 1} \quad (5)$$

Accordingly, the threshold value is learned as follows.

[Equation 6]

$$\begin{cases} Dth_i = Dth_i + Dc_i \text{(when the threshold value is increased)} & (6) \\ \\ Dth_i = Dth_i + Dc_i \text{(when the threshold value is reduce)} & (7) \end{cases}$$

An updating process is carried out in both learning of the reference data and the threshold value. If the Manhattan distance $Gt_i$ obtained from an average of each dimension of $Gm_i$ represented by following equations (8) and (9), the Manhattan distance $Gt_i$ being represented by following equation (10) is small as compared with the threshold value (e.g., about 20% of the threshold value),

[Equation 7]

$$Gm_i = \sum_{k=1}^{N} G_{i,k} \quad (8)$$

$$= (z_{i1}, z_{i2}, \cdots, z_{ij}, \cdots z_{iW}) \quad (9)$$

[Equation 8]

$$Gt_i = \frac{1}{N} \sum_{j=1}^{W} |z_{ij}| \quad (10)$$

neither the reference data nor the threshold value is updated. It is because $Gt_i$ indicates the Manhattan distance between a center of a set of input data and current reference data, i.e., a degree of movement of new reference data from the current reference data $US_i$ and, as small $Gt_i$ means a small updating amount, a recognition rate is not expected to increase so much even if updating is carried out. Accordingly, in the case of a small updating amount, updating is prevented to suppress the number of updating times, and efficient optimization of the reference data is carried out.

Next, an architecture of the associative memory base system based on the optimization algorithms of the reference data and the recognition area will be described.

FIG. 10 is a block diagram showing an architecture of the optimization learning system based on the associative memory. The architecture includes a control circuit 500, a learning circuit 600, a comparison circuit 700, a data storage circuit 800, and a storage destination selection circuit 900 with respect to an associative memory device 400.

The associative memory device 400 includes an associative memory 410 for executing smallest distance search, an input buffer 420 for temporarily storing input data, and an encoder 430 for converting a binary digit ("1" is output only for the winner, and "0" is output for the other address rows) extracted by the associative memory 410 into a row address.

The control circuit 500 controls a process of the entire system. The learning circuit 600 learns and updates a threshold value for deciding reference data and a recognition area of the associative memory device 400 to be an optimal value. The comparison circuit 700 includes comparators 710, 720 respectively prepared for threshold comparison and updating control. The data storage circuit 800 includes first to fourth memories 810 to 840 for storing calculation results for threshold learning, reference data learning, threshold reduction, and threshold enlargement, respectively. The storage destination selection circuit 900 includes first and second counters 910, 920 for selecting storage destinations of data obtained through processes of the control circuit 500 and the learning circuit 600, respectively.

FIG. 11 is a block diagram showing a specific configuration of the learning circuit 600. This learning circuit 600 includes a subtracter 601, an adder 602, a divider 603, a random number generator 604, a probability distribution storage memory 605, registers (REG) 611 to 615 used for data inputting/outputting of the blocks 601 to 605, an input selection switch 621 for selectively fetching input data from the input buffer 420, a winner row address from the encoder 430, and data (memory 1, memory 2, memory 3, and memory 4 hereinafter) from the memories 810 to 840 of the data storage circuit 800 and delivering them to the subtracter 601, the adder 602, and the divider 603, and an output selection switch 622 for delivering the data fetched into the registers 611 to 615 to the associative memory device 400, the data storage circuit 800.

A specific operation in the architecture of the configuration shown in FIGS. 10 and 11 will be described below.

To simplify explanation, it is presumed that $US_i=(80, 110)$ is prestored in the associative memory 410 at an i-th row of reference data of W=2. First, presuming that a threshold value $Dth_i=10$ is stored in the memory 1 for threshold storage, when input data $SB_{i,1}=(75, 112)$ is input to the associative memory 410, if the i-th row becomes a winner, "1" is output to the i-th row alone from the associative memory 410 while "0" is output to the other rows. $(0, \ldots, 1, \ldots, 0)^T$ (T means transposition) are input from the associative memory 410 to the encoder 430, and a row address i is output from the encoder 430.

After the i row has been input to the learning circuit 600, a distance between reference data i-th row, $US_i=(80, 110)$ and input data $SB_{i,1}=(75, 112)$ is calculated based on a distance index (e.g., the Manhattan distance). Subtraction of each dimension is carried out by the subtracter 601. From equation (1), the following is obtained.

[Equation 9]

$$G_{i,k} = SB_{i,k} - US_i \quad (11)$$
$$= (75, 112) - (80, 110) \quad (12)$$
$$= (-5, 2) \quad (13)$$

After conversion of a compliment based on this calculation result, a winner distance (e.g., the Manhattan distance) $Dw_{i,1}=7$ is calculated by using the adder 602. As comparison of a threshold value with the winner distance by the first comparator 710 for threshold comparison shows $Dth_i > Dw_{i,1}$, this winner is a recognized winner, and $G_{i,1}$ is stored in the memory 2 for reference data learning. $Dw_{i,1}=Drw_{i,1}=7$ is established, and $Drw_{i,1}$ is stored in the memory 3 for threshold reduction.

When $\{SB_{i,2}, SB_{i,3}, SB_{i,4}\}=\{(86, 112), (81, 114), (77, 105)\}$ and input data which becomes a recognized winner are input by a predetermined fixed number of times (N=4), $\{G_{i,1}, G_{i,3}, G_{i,4}\}=\{(6, 2), (1, 4), (-3, 5)\}$ and $\{Drw_{i,2}, Drw_{i,3}, Drw_{i,4}\}=\{8, 5, 8\}$ are obtained. $Gm_i=\{-1, 13\}$ is stored in the memory 2 for reference data learning, and the following equation is stored in the memory 2 for threshold reduction.

$$\sum_{k=1}^{N} |Dth_i - Drw_{i,k}| = 12 \quad \text{[Equation 10]}$$

Because of input of N=4, $Gt_i=3$ is obtained from equation (10) by using the subtracter 601, the adder 602, and the divider 603. When $Gt_i=3$ is determined to be small as an updating amount, no learning is carried out. Presuming that an updating amount is small when it is equal to or less than 20% of a threshold value before updating, $Gt_i=3$ is larger than this value, and thus the reference data and the threshold value area are optimized. From the equation (2), the reference data is updated to $US_i=(0, 3)+(80, 110)=(80, 113)$, and the threshold value becomes $Dg_i=3$ from equation (3).

Figure 12:
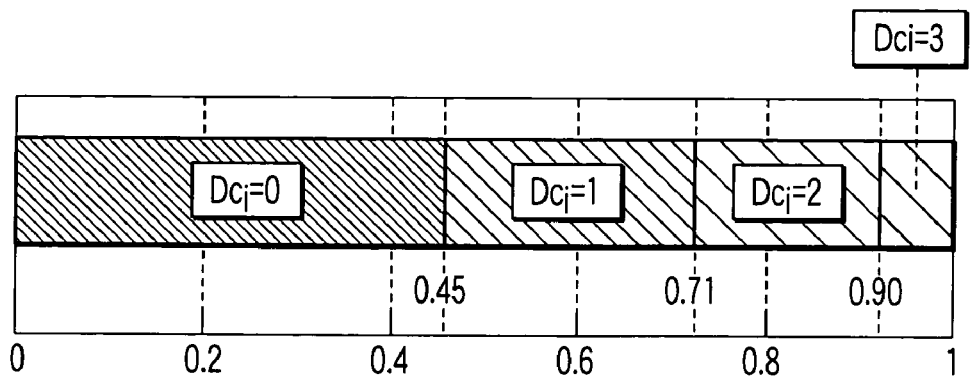
FIG. 12 is a conceptual diagram showing an example of selection of a random number generated when a probability distribution storage memory shown in FIG. 11 is Dg=3.

A method for generating $Dc_i$ by equation (5) will be described below. In FIG. 9, in the case of $Dg_i=3$, the probability distribution storage memory 605 prestores 0.00 to 0.45, 0.46 to 0.71, 0.72 to 0.91, and 0.92 to 1.00 with respect to $Dg_i=3$. In this case, uniform random numbers 0.00 to 1.00 are generated by the random number generator 604. As shown in FIG. 12, $Dc_i=0$, $Dc_i=1$, $Dc_i=2$, and $Dc_i=3$ are respectively obtained in the cases of random numbers 0.00 to 0.45, 0.46 to 0.71, 0.72 to 0.91, and 0.92 to 1.00. When $Dc_i=1$ is obtained, the threshold value is updated to $Dth_i=10-1=9$ from equation (6).

Figure 13:
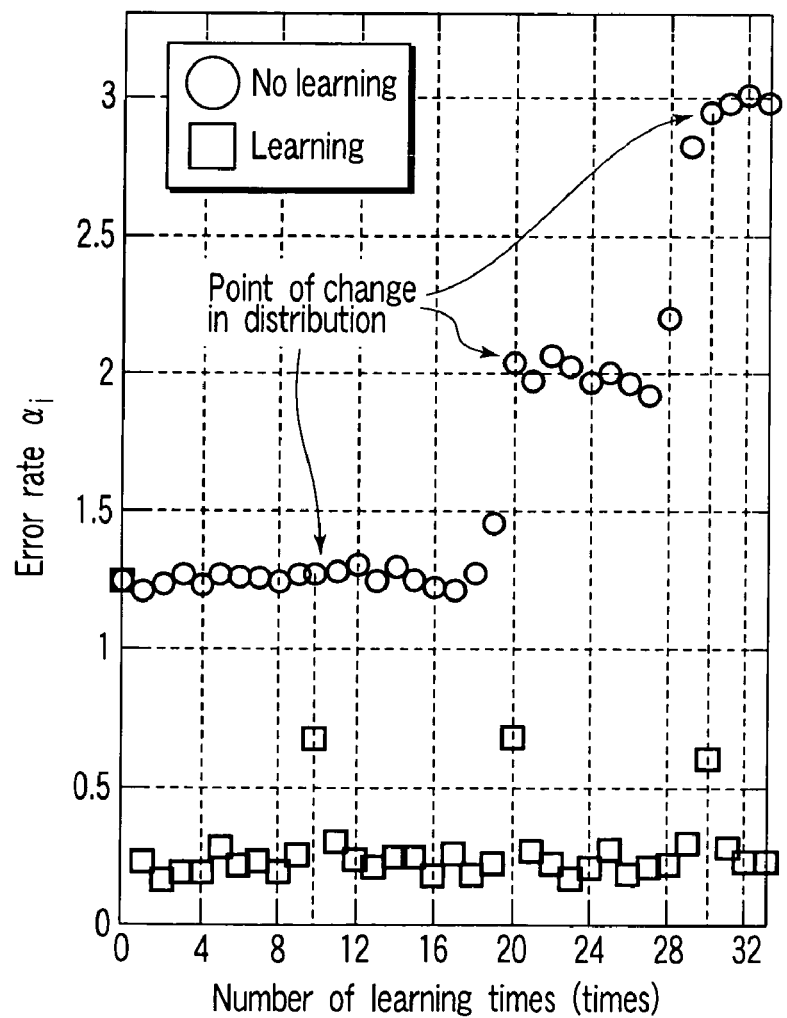
FIG. 13 is a graph showing a simulation result of reference data optimization learning according to the present invention.

The reference data updating learning algorithm and the threshold updating learning algorithm (recognition area optimization algorithm) of each reference data were realized on a computer by using the C language, and simulation was carried out by the computer to verify validity thereof. Results are shown in FIGS. 13 and 14. A number of learning times means a number of times of actually updating the reference data or the threshold value.

Figure 15A:
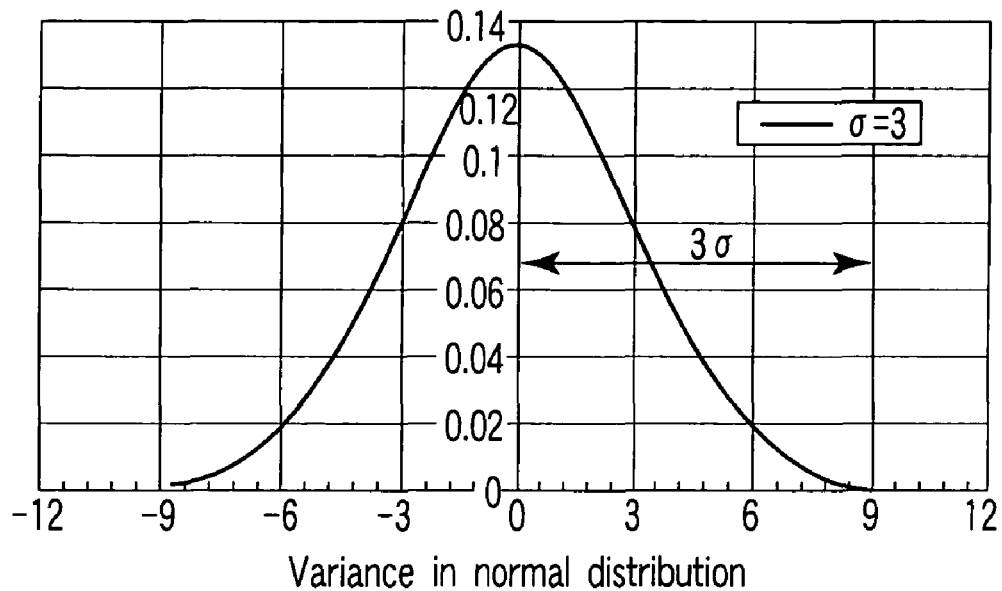
FIG. 15A is a waveform chart of a normal distribution showing a variance situation of input data used for the simulation of FIG. 13.

Simulation conditions of FIG. 13 were R=1, W=5, and N=4, and normal distribution was used for a variance in input data. The normal distribution is probability distribution shown in FIG. 15A, and a variance s from the center is obtained by a probability represented by the following equation.

[Equation 11]

$$p(s) = \frac{1}{2\pi\sigma^2} \exp\left[-\frac{s^2}{2\sigma^2}\right] \quad (14)$$

In this simulation, σ=3 was set. To check execution of optimization of the reference data, when the center of the input data was changed, checking was made as to whether the change was accompanied by a change in the reference data. As its method, when input data was input as much as a fixed number of times, a value of the center of the input data was incremented by "1" in each dimension to be changed little by little. In other words, when the center of the input data was (10, 15) at first, it was changed to (11, 16) after a first change.

Figure 15B:
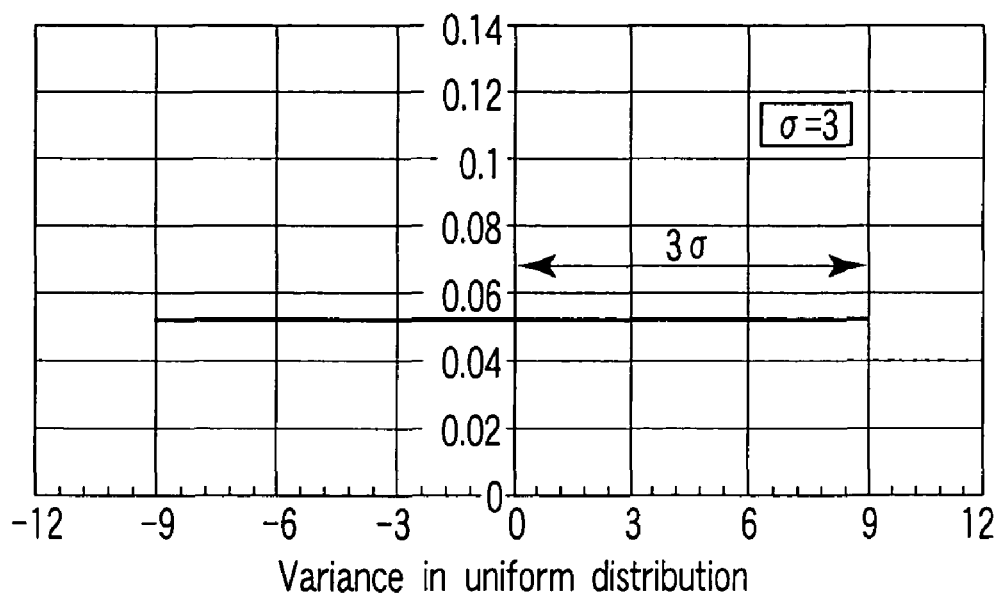
FIG. 15B is a waveform chart of a uniform distribution showing a variance situation of input data used for the simulation of FIG. 14.

Simulation conditions of FIG. 14 were R=1, W=5, and N=4, and normal distribution and uniform distribution were used for a variance of the input data. The uniform distribution is probability distribution shown in FIG. 15B, and a variance s from the center is obtained by a probability represented by the following equation.

[Equation 12]

$$p(s) = \frac{1}{2 \times 3\sigma} \quad (15)$$

$$-3\sigma \le s \le 3\sigma \quad (16)$$

In this simulation, σ=3 was set. In the simulation, the input data was not changed.

As indexes indicating degrees of optimization, an error rate was used in FIG. 13, and a distance error rate was used in FIG. 14. In this case, an error rate $\alpha_i$ is represented by the following equation.

[Equation 13]

$$\alpha_i = \frac{|MSE_i - MSEO_i|}{MSEO_i} \quad (17)$$

$$MSE_i = \frac{1}{N} \sum_{k=1}^{N} \|SB_{i,k} - US_i\|^2 \quad (18)$$

$$MSEO_i = \int \|SB0_i - US0_i\|^2 p(SB0_i) d\,WSB0_i \quad (19)$$

$MSE_i$ is an average square error of the input data with respect to the reference data of the i-th row (calculated for each fixed number of times). $MSE0_i$ is an estimated average square error for obtaining all input data with respect to ideal reference data, an error likely to be generated by an average square error $MSE_i$ when input data are input limitlessly. In other words, the error rate $\alpha_i$ is a rate indicating a degree of deviation of a current average square error $MSE_i$ from an error $MSE0_i$ to be generated. This error rate $\alpha_i$ indicates that the reference data is more optimal as it is closer to "0".

A distance error rate is represented by the following equation.

[Equation 14]

$$\alpha D_i = \frac{|Dth_i - Dmax_i|}{Dmax_i} \quad (20)$$

$Dmax_i$ is a threshold value in which a recognition rate is 100%. Accordingly, this distance error rate indicates that a recognition area is more optimal as it is closer to "0". From the result of FIG. 13, it can be understood that the reference data is optimized by an increase in the number of learning times. It can also be understood that the reference data follows a change in input data distribution to become optimal reference data in accordance with the change of the input data. In FIG. 14, two kinds of input distribution of input data, i.e., the normal distribution and the uniform distribution, were used, and both became threshold values in which recognition rates after learning became equal to or more than 75%. Its possible reason is that as the input data were uneven around the center of the optimal reference data in the case of the input of the normal distribution, the threshold value was difficult to increase, resulting in an increase of the distance error rate.

The embodiment has been described by taking the Manhattan distance as the example of the distance index. However, other indexes such as the Euclidean distance, Hamming distance, and Mahalanobis distance can be used.

The embodiment has been described by way of the pattern recognition system based on the associative memory. However, the present invention is not limited to this. For example, the invention can be applied to a pattern recognition system based on a processor. An embodiment of the system based on the processor will be described below by referring to FIG. 16.

Figure 16:
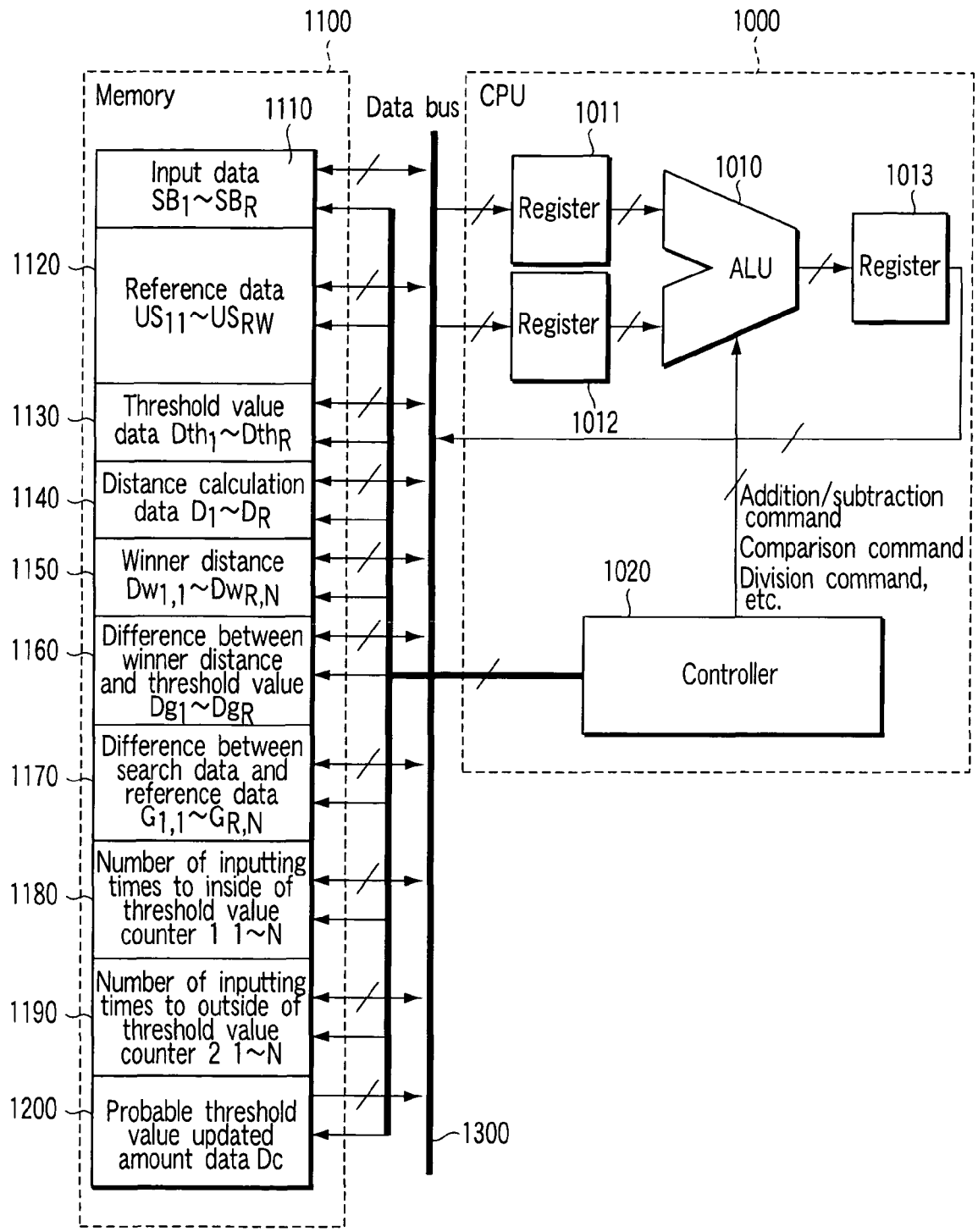
FIG. 16 is a block diagram showing a configuration of a processor pattern recognition system which employs the optimization learning method of the present invention.

FIG. 16 is a block diagram showing a configuration of the pattern recognition system based on the processor which employs the optimization learning method of the present invention. In FIG. 16, 1000 is a central processing unit (CPU), 1100 is a memory, and 1300 is a data bus for transferring written data, read data between the CPU 1000 and the memory 1100.

The CPU 1000 includes an arithmetic and logic unit (ALU) 1010, registers 1011 to 1013, and a controller 1020. The controller 1020 controls reading/writing in the memory 1100 while it instructs the ALU 1010 to selectively execute addition/subtraction, comparison, division or the like based on a preregistered program. In an input/output section of the ALU 1010, the registers 1011 to 1013 are arranged as buffers.

The memory 1100 includes an area 1110 for temporarily storing input data $SB_1$ to $SB_R$, an area 1120 for storing reference data $US_{11}$ to $US_{RW}$ to enable updating, an area 1130 for storing threshold data $Dth_1$ to $Dth_R$, an area 1140 for storing distance calculation results $D_1$ to $D_R$ of the CPU 1000, an area 1150 for storing winner distances $Dw_{1,1}$ to $Dw_{R,N}$, an area 1160 for storing differences $Dg_1$ to $Dg_R$ between winner distances and threshold values, an area 1170 for storing differences $G_{1,1}$ to $G_{R,N}$ between search data and reference data, an area 1180 for storing values (first counter values) 1 to N of numbers of times of inputting to the inside of the threshold value, an area 1190 for storing values (second counter values) 1 to N of numbers of times of inputting to the outside of the threshold value, and an area 1200 for storing probable threshold updating amount data Dc, and reading/writing is controlled by the controller 1020 of the CPU 1000 side.

According to the above configuration, for an execution program of the controller 1020, a process similar to that of the associative memory is executed by software. That is, in the CPU 1000, by transferring data with the memory 1100, distances equivalent to similarities are calculated between input data of a pattern search target and a plurality of reference data, and reference data present in a smallest distance in a recognition area decided by a threshold is selected as recognized data.

In this case, the optimization learning process of the reference data based on the flowchart of FIG. 7 is embraced in the execution program of the controller 1020. Accordingly, the reference data in the memory 1100 is always updated to be optimal, thereby enabling shortening of time necessary for pattern recognition. As described above, in the case of the conventional system based on the processor, as no updating process by optimization learning of the reference data is embraced, it is difficult to shorten time for pattern recognition and to increase a recognition rate. However, this problem is solved by embracing the optimization process of the present invention, and shortening of time for pattern recognition and an increase of a recognition rate can be realized.

In the system based on the processor, as an example of a distance index, indexes other than the Manhattan distance, such as the Euclidean distance, Hamming distance, and Mahalanobis distance, can be used.

The present invention can be applied to a pattern matching process for an artificial intelligence system, an autonomous robot, an authentication system, an illegal entry detection system (IDS), a databank system, an Internet router, object recognition, an electric arm, a domestic help robot, and the like.

What is claimed is:

1. A reference data optimization apparatus which performs calculation of distances equivalent to similarities between input data of a pattern search target and a plurality of reference data and which is used for pattern recognition for selecting, as recognition data, reference data of a smallest distance present in a recognition area decided by a threshold value and which optimizes the reference data for the pattern recognition by learning the recognition data, comprising:
   an input data fetching unit configured to fetch, as many as a fixed number of times, input data corresponding to the reference data to be selected as the recognition data;
   a gravity center point operating unit configured to obtain a gravity center point of a distance distribution between the input data of the fixed number of times fetched by the input data fetching unit and the respectively corresponding reference data;
   a reference data moving unit configured to move a position of the reference data to be positioned in the gravity center point obtained by the gravity center point operating unit; and
   a recognition area control unit configured to control reduction or enlargement recognition areas by changing the threshold value to prevent overlap between the recognition areas set in reference data adjacent to each other, at the movement of the position of the reference data.

2. A reference data optimization apparatus which performs calculation of distances equivalent to similarities between input data of a pattern search target and a plurality of reference data and which is used for pattern recognition for selecting, as recognition data, reference data of a smallest distance present in a recognition area decided by a threshold value and which optimizes the reference data for the pattern recognition by learning the recognition data, comprising:
   an input data fetching unit configured to fetch, as many as a fixed number of times, input data corresponding to the reference data to be selected as the recognition data;
   a counter unit configured to count the numbers of input data present inside and outside the recognition area; and
   a recognition area control unit configured to change the threshold value to the side which reaches the fixed number of times inside and outside the recognition area by the counter to reduce or enlarge the recognition area.

3. The reference data optimization apparatus according to any one of claims 1 and 2, wherein the recognition area control unit is configured to select a changing amount of the threshold value from a preset probability distribution.

4. The reference data optimization apparatus according to any one of claims 1 and 2, wherein the recognition area control unit is configured to compare a value indicating a distance between a center of a group of the input data and current reference data with a reference value, and changes the threshold value only when the reference value is exceeded.

5. The reference data optimization apparatus according to any one of claims 1 and 2, wherein one of the Euclidean distance, Manhattan distance, Hamming distance, and Mahalanobis distance is used as an index of a distance supplied for the distance calculation.

6. A pattern recognition system comprising:
   an associative memory equipped with at least a reference data storage unit configured to store a plurality of reference data to recognize search data of input patterns, smallest distance search unit configured to obtain the reference data which present in a smallest distance to the search data, and a determination unit configured to determine identity between the search data and the reference data of the smallest distance in accordance with whether the smallest distance is equal to or more than a threshold value;
   an optimization unit configured to optimize the reference data by fetching, as many as a fixed number of times, input data corresponding to the reference data to be selected as recognition data, obtaining a gravity center point of a distance distribution between the input data and the reference data, and moving a position of the reference data to be positioned in the gravity center point;
   a movement limiter unit configured to limit the movement to prevent overlap between recognition areas of the reference data and adjacent reference data, at the movement of the position of the reference data; and
   an updating unit configured to update the reference data stored in the reference data storage means based on the reference data optimized by the optimization unit.

7. A pattern recognition system comprising:
   an associative memory equipped with at least a reference data storage unit configured to store a plurality of reference data to recognize search data of input patterns, a smallest distance search unit configured to obtain reference data which present in a smallest distance to the search data, and a determination unit configured to determine identity between the search data and the reference data of the smallest distance in accordance with whether the smallest distance is equal to or more than a threshold value;
   an optimization unit configured to optimize the reference data by fetching, as many as a fixed number of times, input data corresponding to the reference data to be selected as recognition data, obtaining a gravity center point of a distance distribution between the input data and the reference data, and moving a position of the reference data to be positioned in the gravity center point;

a recognition area control unit configured to set threshold values to determine the recognition areas for the reference data, respectively, to prevent overlap between the recognition areas of reference data adjacent to each other, and to reduce or enlarge the recognition areas, at the movement of the position of the reference data; and an updating unit configured to update the reference data stored in the reference data storage unit based on the reference data optimized by the optimization unit.

8. A pattern recognition system comprising:

an associative memory equipped with at least a reference data storage unit configured to store a plurality of reference data to recognize search data of input patterns, a smallest distance search unit configured to obtain the search data and reference data present in a smallest distance, and a determination unit configured to determine identity between the search data and the reference data of the smallest distance in accordance with whether the smallest distance is equal to or more than a threshold value;

an optimization unit configured to fetch sequentially input data corresponding to reference data to be selected as recognition data, count the numbers of input data present inside and outside a recognition area decided by the threshold value, and changing the threshold value to a side which first reaches a fixed number of times inside and outside the recognition area to reduce or enlarge the recognition area; and an updating unit configured to update the reference data stored in the reference data storage unit based on the reference data optimized by the optimization unit.

9. The pattern recognition system according to any one of claims 7 and 8, wherein the optimization unit selects a changing amount of the threshold value from a preset probability distribution.

10. The pattern recognition system according to any one of claims 7 and 8, wherein the optimization unit compares a value indicating a distance between a center of a group of the input data and current reference data with a reference value, and changes the threshold value only when the reference value is exceeded.

11. The pattern recognition system according to any one of claims 6, 7 and 8, wherein one of the Euclidean distance, Manhattan distance, Hamming distance, and Mahalanobis distance is used as an index of a distance supplied for the distance calculation.

12. The pattern recognition system according to any one of claims 6, 7 and 8, wherein the associative memory and the optimization unit are incorporated in a one-chip integrated circuit.

13. A pattern recognition system comprising:

an arithmetic processing device equipped with a processor for executing arithmetic processing in accordance with a program, and a storage unit configured to store at least a plurality of reference data to recognize search data of input patterns, an arithmetic processing result of the processor, and a parameter used for the arithmetic processing, the processor obtaining the search data and reference data present in a smallest distance based on the program, and determining identity between the search data and the reference data of the smallest distance in accordance with whether the smallest distance is equal to or more than a threshold value; and an optimization unit configured to optimize the reference data by fetching, as many as a fixed number of times, input data corresponding to the reference data to be selected as recognition data, obtaining a gravity center point of a distance distribution between the input data and the reference data, and moving a position of the reference data to be positioned in the gravity center point;

a movement limiter unit configured to limit the movement to prevent overlap between recognition areas of the reference data and adjacent reference data, at the movement of the position of the reference data; and an updating unit configured to update the reference data stored in the reference data storage unit based on the reference data optimized by the optimization unit, wherein the arithmetic processing device and the optimization unit are incorporated in a one-chip integrated circuit.

14. A pattern recognition system comprising:

an arithmetic processing device equipped with a processor for executing arithmetic processing in accordance with a program, and a storage unit configured to store at least a plurality of reference data to recognize search data of input patterns, an arithmetic processing result of the processor, and a parameter used for the arithmetic processing, the processor obtaining the search data and reference data present in a smallest distance based on the program, and determining identity between the search data and the reference data of the smallest distance in accordance with whether the smallest distance is equal to or more than a threshold value;

an optimization unit configured to optimize the reference data by fetching, as many as a fixed number of times, input data corresponding to the reference data to be selected as recognition data, obtaining a gravity center point of a distance distribution between the input data and the reference data, and moving a position of the reference data to be positioned in the gravity center point;

a recognition area control unit configured to set threshold values to determine the recognition areas for the reference data, respectively, changing the threshold value to prevent overlap between the recognition areas of reference data adjacent to each other, and reducing or enlarging the recognition areas, at the movement of the position of the reference data; and an updating unit configured to update the reference data stored in the reference data storage unit based on the reference data optimized by the optimization unit.

15. A pattern recognition system comprising:

an arithmetic processing device equipped with a processor for executing arithmetic processing in accordance with a program, and a storage unit configured to store at least a plurality of reference data to recognize search data of input patterns, an arithmetic processing result of the processor, and a parameter used for the arithmetic processing, the processor obtaining the search data and reference data present in a smallest distance based on the program, and determining identity between the search data and the reference data of the smallest distance in accordance with whether the smallest distance is equal to or more than a threshold value;

an optimization unit configured to reduce or enlarge the recognition area, sequentially fetching input data corresponding to reference data to be selected as the recognition data, counting the numbers of input data present inside and outside a recognition area decided by the threshold value, and changes the threshold value to a side which first reaches a fixed number of times inside and outside the recognition area; and an updating unit configured to update the reference data stored in the reference data storage unit based on the reference data optimized by the optimization unit.

16. The pattern recognition system according to any one of claims 14 and 15, wherein the optimization unit selects a changing amount of the threshold value from a preset probability distribution.

17. The pattern recognition system according to any one of claims 14 and 15, wherein the optimization unit compares a value indicating a distance between a center of a group of the input data and current reference data with a reference value, and changes the threshold value only when the reference value is exceeded.

18. The pattern recognition system according to any one of claims 13, 14 and 15, wherein one of the Euclidean distance, Manhattan distance, Hamming distance, and Mahalanobis distance is used as an index of a distance supplied for the distance calculation.

19. The pattern recognition system according to claim any one of claims 14 and 15, wherein the arithmetic processing device and the optimization unit are incorporated in a one-chip integrated circuit.

* * * * *